United States Patent
Yaguchi

(10) Patent No.: US 10,439,237 B2
(45) Date of Patent: Oct. 8, 2019

(54) FUEL CELL SYSTEM AND CONTROL OF COLLECTOR AND BURNER WHEN STOPPED

(71) Applicant: NISSAN MOTOR CO., LTD., Yokohama-shi, Kanagawa (JP)

(72) Inventor: Tatsuya Yaguchi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/781,522

(22) PCT Filed: Sep. 26, 2016

(86) PCT No.: PCT/JP2016/078218
§ 371 (c)(1),
(2) Date: Jun. 5, 2018

(87) PCT Pub. No.: WO2017/104211
PCT Pub. Date: Jun. 22, 2017

(65) Prior Publication Data
US 2018/0277865 A1    Sep. 27, 2018

(30) Foreign Application Priority Data

Dec. 15, 2015 (JP) .................................. 2015-244172

(51) Int. Cl.
*H01M 8/04082* (2016.01)
*H01M 8/04303* (2016.01)
(Continued)

(52) U.S. Cl.
CPC ... *H01M 8/04201* (2013.01); *H01M 8/04022* (2013.01); *H01M 8/04228* (2016.02);
(Continued)

(58) Field of Classification Search
CPC ......... H01M 8/04228; H01M 8/04738; H01M 8/04201; H01M 2008/1293;
(Continued)

(56) References Cited

U.S. PATENT DOCUMENTS 6,974,645 B2    12/2005    Itou et al.
8,284,521 B2    10/2012    Ohtsu
(Continued)

FOREIGN PATENT DOCUMENTS

JP    2000-192863 A    7/2000
JP    2003-187835 A    7/2003
(Continued)

*Primary Examiner* — Milton I Cano
*Assistant Examiner* — Philip A. Stuckey
(74) *Attorney, Agent, or Firm* — Foley & Lardner LLP

(57) ABSTRACT a fuel cell system comprises a solid oxide fuel cell which generates a power by receiving a supply of an anode gas and a cathode gas, the system further comprising: a fuel tank to store a liquid fuel which is to become the anode gas, an anode gas supply path connecting the fuel tank and an anode electrode of the fuel cell, an exhaust gas burner to burn an anode off-gas and a cathode off-gas, both gases been discharged from the fuel cell, a collector which is communicated to the fuel tank and collects the fuel which is vaporized in the fuel tank, and a fuel supply path which connects the collector with the exhaust gas burner. When the fuel cell system is stopped, the fuel collected by the collector is supplied to the exhaust gas burner via the fuel supply path.

9 Claims, 7 Drawing Sheets

(51) Int. Cl.
*H01M 8/04228* (2016.01)
*H01M 8/04955* (2016.01)
*H01M 8/0662* (2016.01)
*H01M 8/0606* (2016.01)
*H01M 8/04014* (2016.01)
*H01M 8/04746* (2016.01)
*H01M 8/1231* (2016.01)
*H01M 8/124* (2016.01)
*H01M 8/0612* (2016.01)

(52) U.S. Cl.
CPC ... *H01M 8/04303* (2016.02); *H01M 8/04776* (2013.01); *H01M 8/04955* (2013.01); *H01M 8/0606* (2013.01); *H01M 8/0662* (2013.01); *H01M 8/0618* (2013.01); *H01M 8/1231* (2016.02); *H01M 2008/1293* (2013.01)

(58) Field of Classification Search
CPC ......... H01M 8/04776; H01M 8/04022; H01M 8/0606; H01M 8/04955; H01M 8/0662; H01M 8/04303; H01M 8/0618; H01M 8/1231
See application file for complete search history.

(56) References Cited

U.S. PATENT DOCUMENTS

| | | |
|---|---|---|
| 2004/0048122 A1 | 3/2004 | Itou et al. |
| 2004/0053088 A1 | 3/2004 | Haga |
| 2008/0212234 A1 | 9/2008 | Ohtsu |
| 2015/0188174 A1* | 7/2015 | Iwakiri ............... H01M 8/0612 429/415 |
| 2018/0097246 A1* | 4/2018 | Meder ............... H01M 8/04089 |

FOREIGN PATENT DOCUMENTS

| | | | |
|---|---|---|---|
| JP | 2004-103453 A | 4/2004 | |
| JP | 2009-238618 A | 10/2009 | |
| JP | 2009-295380 A | 12/2009 | |
| JP | 2012-134046 A | 7/2012 | |
| WO | WO-2016165824 A1 * | 10/2016 | ........ H01M 8/04089 |

* cited by examiner

FUEL CELL SYSTEM AND CONTROL OF COLLECTOR AND BURNER WHEN STOPPED

TECHNICAL FIELD

The present invention relates to a fuel cell system and a controlling method thereof.

BACKGROUND ART

There has been known a solid oxide fuel cell (SOFC) which acts at a comparatively high temperature wherein an anode gas is supplied to one side and a cathode gas (air, etc.) is supplied to the other side. The anode electrode used in this SOFC is prone to be readily oxidized when the fuel cell system is stopped and the temperature thereof falls.

Accordingly, for example, in JP2009-295380A, a technology is disclosed to prevent oxidation of the anode electrode by continuing the supply of the anode gas during the fuel cell system is stopped.

SUMMARY OF INVENTION

In the solid oxide fuel cell system like this, action temperature of the fuel cell is high, about 800° C. Therefore, in the solid oxide fuel cell system like this, when the system stop control is executed with responding to the system stop request, etc., there is a possibility that the anode electrode is oxidized unless the oxygen partial pressure of the anode electrode is properly controlled in accordance with the temperature of the fuel cell.

An object of the present invention is to provide other fuel cell system in which deterioration by oxidation in the anode electrode of the fuel cell during stop of the system can be suppressed.

According to one embodiment, a fuel cell system comprises a solid oxide fuel cell which generates a power by receiving a supply of an anode gas and a cathode gas, the system further comprising: a fuel tank to store a liquid fuel which is to become the anode gas, an anode gas supply path connecting the fuel tank and an anode electrode of the fuel cell, an exhaust gas burner to burn an anode off-gas and a cathode off-gas, both gases been discharged from the fuel cell, a collector which is communicated to the fuel tank and collects the fuel which is vaporized in the fuel tank, and a fuel supply path which connects the collector with the exhaust gas burner. When the fuel cell system is stopped, the fuel collected by the collector is supplied to the exhaust gas burner via the fuel supply path.

DESCRIPTION OF EMBODIMENTS

Hereunder, embodiments of the present invention will be explained with referring to the attached figures.

First Embodiment

Figure 1:
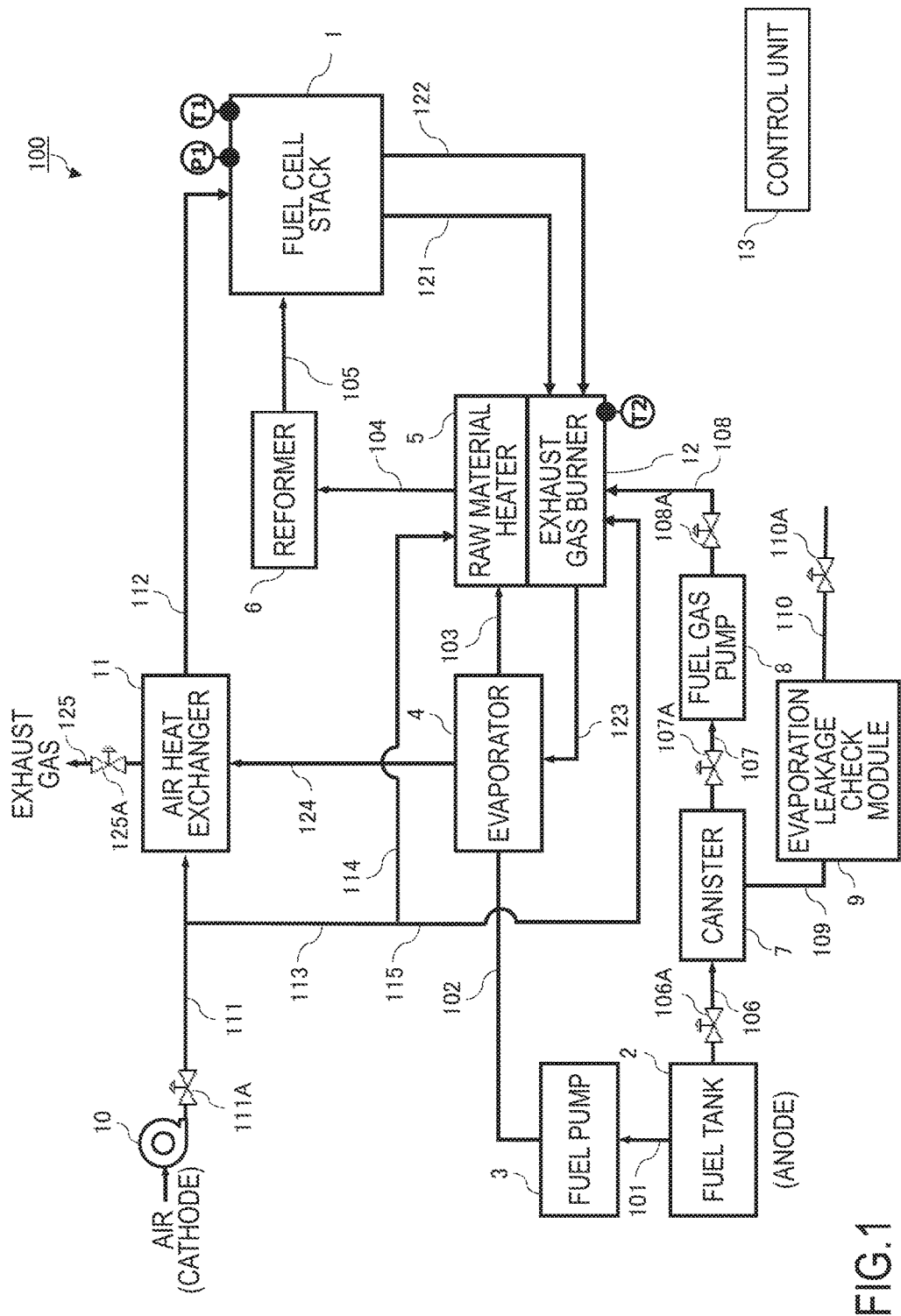
FIG. 1 is a block diagram of the fuel cell system according to the first embodiment.

FIG. 1 is a block diagram showing main components of the solid oxide fuel cell (SOFC) in the first embodiment.

A fuel cell stack 1, SOFC, is a stack of the cells configured such that an electrolyte layer formed by a solid oxide such as a ceramic is sandwiched between an anode electrode (fuel electrode) into which an anode gas (fuel gas) is supplied and a cathode electrode (air electrode) into which an air including oxygen is supplied as a cathode gas (oxidizing gas). In the fuel cell stack 1, the fuel such as hydrogen included in the anode gas and oxygen in the cathode gas are caused to react so as to generate a power; and then, the anode gas after the reaction (anode off-gas) and the cathode gas after the reaction (cathode off-gas) are discharged. Meanwhile, the fuel cell stack 1 is provided with a temperature sensor T1 and a pressure sensor P1.

The solid oxide fuel cell system provided with the fuel cell stack 1 (hereinafter, this system is referred to as a fuel cell system 100) comprises a fuel supply system with which the anode gas is supplied to the fuel cell stack 1, an air supply system with which the cathode gas is supplied to the fuel cell stack 1, and an exhaust system with which the anode off-gas and the cathode off-gas are discharged to outside the fuel cell system 100.

The fuel supply system comprises a fuel tank 2, a fuel pump 3, an evaporator 4, a raw material heater 5, a reformer 6, a canister (collector) 7, a fuel gas pump 8, an evaporation leakage check module 9, etc. The air supply system comprises a cathode compressor 10, an air heat exchanger 11, etc. The exhaust system comprises an exhaust gas burner 12, etc. Besides, the fuel cell system 100 comprises a control unit 13 to control actions of the entire system. The control unit 13 controls various equipment of the fuel cell system 100 so as to execute the stop control of the fuel cell system 100.

Hereunder, each system will be explained in detail. First, details of the fuel supply system will be explained.

In the fuel supply system, a fuel such as water-containing ethanol stored in the fuel tank 2 is sent out by the fuel pump 3 via a path 101. The fuel that is sent out from the fuel pump 3 is supplied to the evaporator 4 via a path 102. The evaporator 4 vaporizes the liquid fuel by utilizing a heat of an exhaust gas from the exhaust gas burner 12 to produce the fuel gas.

The fuel gas that is produced in the evaporator 4 reaches the raw material heater 5 via a path 103. The raw material heater 5 is arranged side by side with the exhaust gas burner 12, so that the fuel gas is further heated up by utilizing the heat generated in the exhaust gas burner 12 to the temperature at which the fuel gas can be reformed in the reformer 6.

When the fuel gas reaches the reformer 6 from the raw material heater 5 via a path 104, the fuel gas is reformed in the reformer 6 to the anode gas by a catalytic reaction. Then, the anode gas is supplied to the anode electrode of the fuel cell stack 1 from the reformer 6 via a path 105. For example, when the fuel is water-containing ethanol, the anode gas includes methane, hydrogen, carbon monoxide, etc.

Inside the fuel tank 2, the fuel gas formed by vaporization of part of the fuel is present. The fuel gas in the fuel tank 2 reaches the canister 7 via a path 106. The canister 7 comprises an active carbon, etc., and collects the fuel gas. The fuel gas collected in the canister 7 reaches the fuel gas pump 8 via a path 107; and thereafter, it is supplied to the exhaust gas burner 12 by the fuel gas pump 8 via a path 108. At the same time, the canister 7 is configured such that the outside air may be taken thereinto via a path 109 and a path 110, as needed. In the path 109 and the path 110, the evaporation leakage check module 9 is arranged in order to monitor discharge of the fuel gas to outside the fuel cell system 100. When the evaporation leakage check module 9 detects the fuel gas, the control unit 13 alerts an operator and so forth that there is a possibility of discharge of the fuel gas to outside the fuel cell system 100.

Meanwhile, the path 106 is provided with a valve 106A, the path 107 with a valve 107A, the path 108 with a valve 108A, and the path 110 with a valve 110A, respectively. Open and close of the valve 106A, the valve 107A, the valve 108A, and the valve 110A, is controlled by the control unit 13.

Next, details of the air supply system will be explained.

In the air supply system, when an air, which is the cathode gas taken thereinto from outside, is taken into the fuel cell system 100 by the cathode compressor 10 via a path 111; then, at first it reaches the air heat exchanger 11. Meanwhile, the path 111 is provided with a valve 111A which is controllable by the control unit 13.

In the air heat exchanger 11, the cathode gas is heated by utilizing the heat of the exhaust gas from the exhaust gas burner 12. The cathode gas heated by the air heat exchanger 11 is supplied to the fuel cell stack 1 via a path 112.

In the way as mentioned above, to the fuel cell stack 1, the anode gas is supplied from the fuel supply system and the cathode gas is supplied from the air supply system. And in the fuel cell stack 1, the anode gas and the cathode gas are caused to react so as to generate a power; and then, the anode off-gas and the cathode off-gas are discharged to outside the fuel cell system 100 via the exhaust system.

Next, details of the exhaust system will be explained.

From the fuel cell stack 1, the anode off-gas is discharged via a path 121 and the cathode off-gas is discharged via a path 122. The anode off-gas and the cathode off-gas are burnt by a catalytic oxidation reaction in the exhaust gas burner 12; and then, they are discharged as an exhaust gas. The heat generated by the combustion is transferred to the raw material heater 5 which is arranged side by side with the exhaust gas burner 12. After the exhaust gas reaches the evaporator 4 via a path 123, it reaches the air heat exchanger 11 via a path 124. Then, the exhaust gas is discharged to outside the fuel cell system 100 via a path 125. Meanwhile, the path 125 is provided with a valve 125A.

The exhaust gas burner 12 comprises the catalyst support such as cordierite and an oxidation catalyst supported on this support; and in it the anode off-gas and the cathode off-gas are mixed; then, the resulting mixed gas is burnt by the oxidation catalyst to generate the exhaust gas mainly comprising carbon dioxide and water. To the exhaust gas burner 12, the cathode gas (air) can be supplied via a path 115, and the fuel gas can be supplied via the path 108. The path 108 is provided with the valve 108A. The control unit 13 controls the supply amount of the fuel gas supplied to the exhaust gas burner 12 by using the valve 108A, thereby controlling the catalytic combustion reaction in the exhaust gas burner 12. Meanwhile, the exhaust gas burner 12 is provided with a temperature sensor T2.

Meanwhile, the control unit 13 controls the entire fuel cell system 100 by controlling each component of the fuel cell system 100 as well as the valves, etc., of each system. Meanwhile, the control unit 13 is provided with a microcomputer comprising a central processing unit (CPU), a read only memory (ROM), a random access memory (RAM), and an input output interface (I/O).

Now, the principle of the present invention will be explained by explaining the state of the anode electrode of the fuel cell stack 1, by using FIG. 2.

Figure 2:
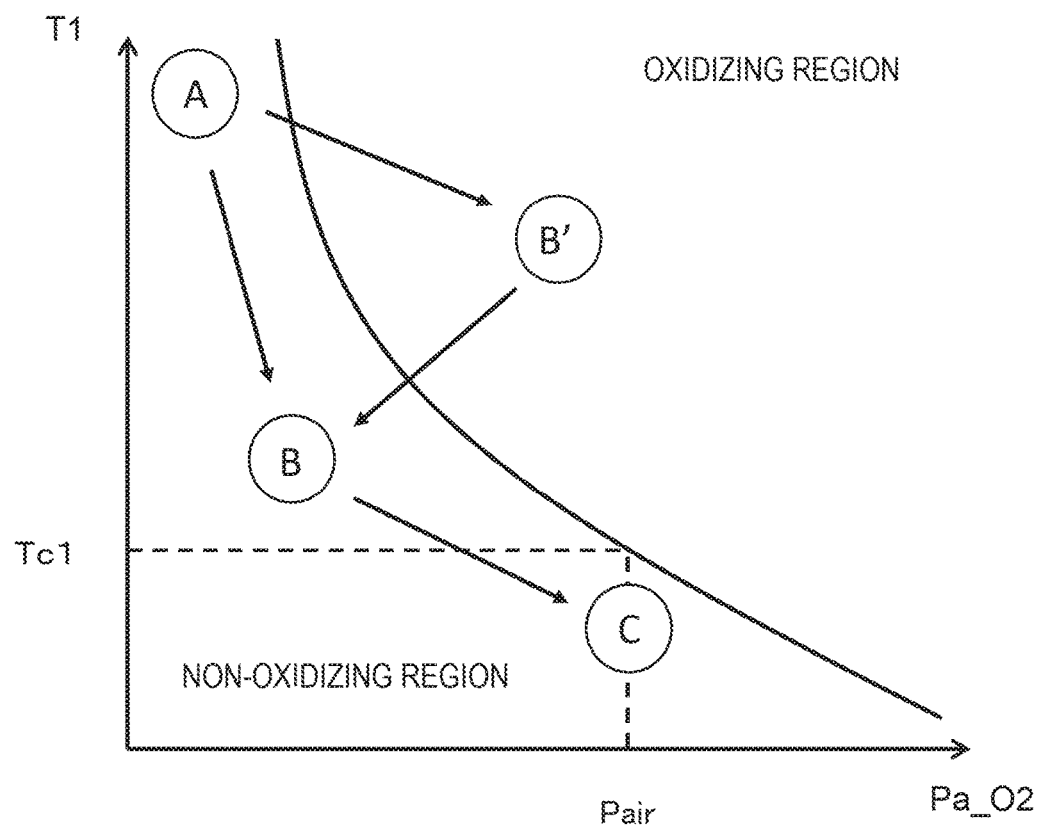
FIG. 2 is a figure showing the state of the anode electrode.

FIG. 2 shows the oxidation state of the anode electrode. In the horizontal axis, an oxygen partial pressure $Pa\_O2$ in the anode electrode is shown; and in the vertical axis, a temperature $T1$ of the fuel cell stack 1 is shown.

Meanwhile, the anode electrode formed of a metal such as nickel is prone to be more readily deteriorated by oxidation as the temperature $T1$ becomes higher. Namely, when the temperature $T1$ is high and the oxygen partial pressure $Pa\_O2$ is high, the anode electrode of the fuel cell stack 1 is prone to be readily oxidized. FIG. 2 shows that, when the region defined by the temperature $T1$ and the oxygen partial pressure $Pa\_O2$ is in the oxidizing region located in the upper right of the figure, there is a high possibility that the anode electrode is oxidized.

On the other hand, when the temperature $T1$ is low and the oxygen partial pressure $Pa\_O2$ is low, the anode electrode of the fuel cell stack 1 is not readily oxidized. Namely, in FIG. 2, it is shown that, when the region defined by the temperature $T1$ and the oxygen partial pressure $Pa\_O2$ is in the non-oxidizing region located in the lower left of the figure, the possibility that the anode electrode is oxidized is low.

Meanwhile, in this embodiment, it is assumed that supplies of the cathode gas and the anode gas are stopped at the time when the stop control process of the fuel cell system 100 is started. By so doing, the fuel cell stack 1 is not cooled down forcibly, but cooled down naturally.

The stop control process of the fuel cell system 100 is started by re-press of the vehicle's start button or from the time when the battery which stores the power generated in the fuel cell stack 1 is fully charged. When the natural cooling of the fuel cell system 100 is over, and at the time when the controls of each component of the fuel cell system 100 is completed, the stop control process is terminated. Meanwhile, the system stop control, which is the stop control process of the fuel cell system 100, is the control that is executed during stop of the system, wherein "during stop of the system" means the period from a start of the system stop control till a next start-up of the system.

Meanwhile, FIG. 2 shows the transition from the state when the fuel cell system 100 starts the stop control process by re-pressing the vehicle's start button, or the like (State A), to the state when the cooling of the fuel cell system 100 is completed (State C). Accordingly, during the transition period from the State A to the State C, the stop control process is executed in the fuel cell system 100.

In the State A, which is the state immediately after start of the stop control process of the fuel cell system 100, the temperature $T1$ is high and the oxygen partial pressure $Pa\_O2$ is low. From this state, as the fuel cell stack 1 is cooled down, an atmospheric air is flowed into the fuel cell stack 1, so that the state in which the temperature $T1$ is low and the oxygen partial pressure $Pa\_O2$ is low, namely the State C is resulted.

Here, if the increase rate of the oxygen partial pressure $Pa\_O2$ is faster as compared with the drop rate of the temperature $T1$, the transition goes through the state in which the temperature $T1$ is high and the oxygen partial pressure $Pa\_O2$ is high, such as the state B' which is included in the oxidizing region, so that there is a possibility that the anode electrode is deteriorated by oxidation. However, if the oxygen partial pressure $Pa\_O2$ can be controlled with responding to the temperature $T1$ in such a way that the transition may go through the state B of the non-oxidizing region in which the temperature T1 is low and the oxygen partial pressure Pa_O2 is low, deterioration of the anode electrode can be suppressed.

Accordingly, the control unit 13 controls the oxygen partial pressure Pa_O2 of the anode electrode in such a way that the region defined by the temperature T1 and the oxygen partial pressure Pa_O2 may always be in the non-oxidizing region during natural cooling of the fuel cell system 100. Hereunder, details of this control will be explained.

Meanwhile, in FIG. 2, the atmospheric oxygen partial pressure Pair is shown. Here, the oxygen partial pressure Pa_O2 of the anode electrode transits from the value near to zero to the atmospheric oxygen partial pressure Pair during the period from start of the stop control process of the fuel cell system 100 till completion of the natural cooling of the fuel cell stack 1. Therefore, the oxygen partial pressure Pa_O2 of the anode electrode never becomes higher than the atmospheric oxygen partial pressure Pair.

Accordingly, when the temperature of the fuel cell stack 1 is lower than a temperature Tc1, the temperature corresponding to the atmospheric oxygen partial pressure Pair in the boundary between the oxidizing region and the non-oxidizing region, there is no possibility of oxidation of the anode electrode. Therefore, when the temperature of the fuel cell stack 1 is lower than the temperature Tc1, it is judged that possibility of oxidation of the anode electrode is low, so that the stop control process of the fuel cell system 100 can be terminated. Hereinafter, the temperature Tc1 as mentioned above is referred to as the stop temperature Tc1.

Figure 3:
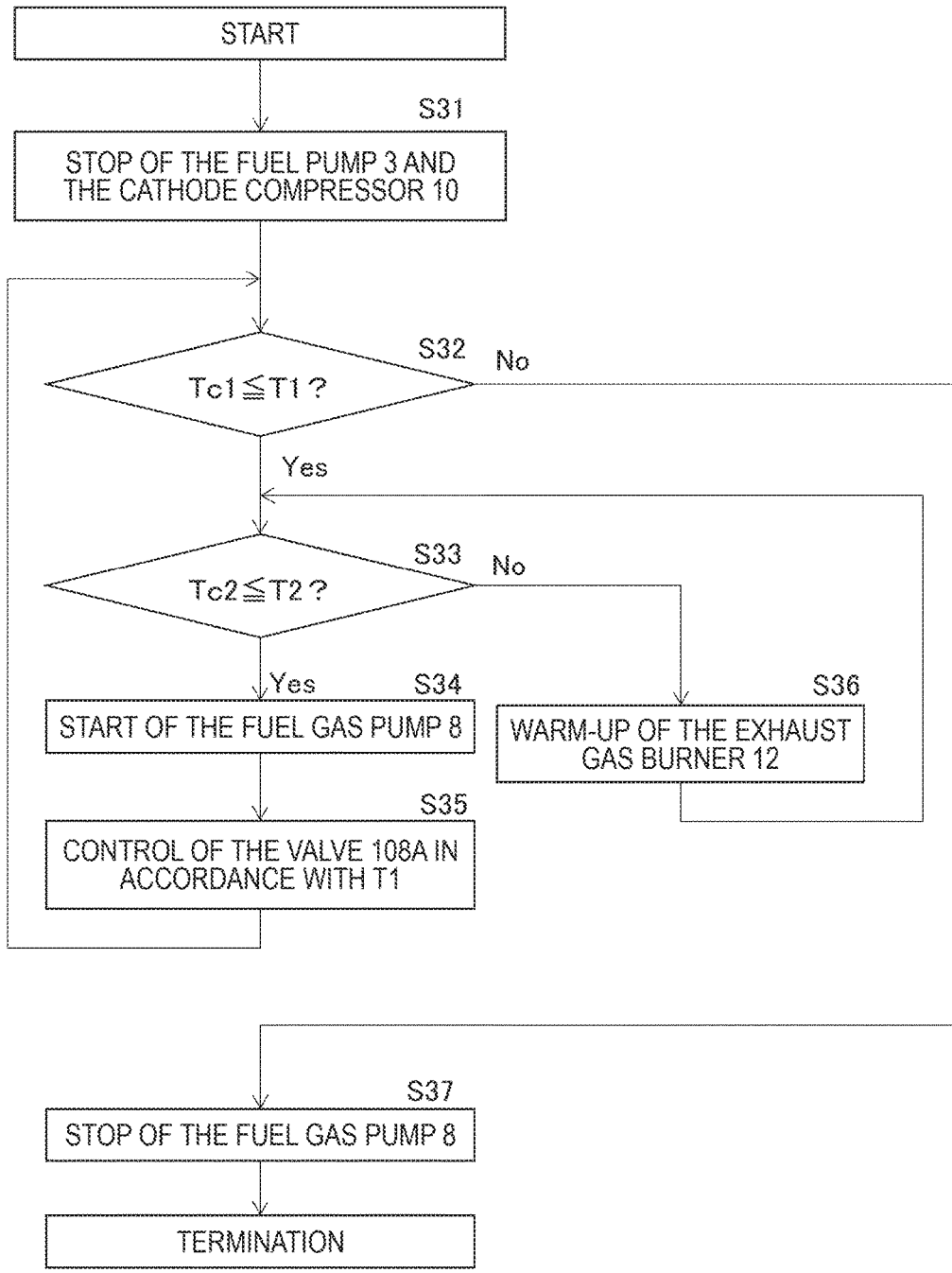
FIG. 3 is a flow chart showing the stop control process.

FIG. 3 is a flow chart of the stop control process of this embodiment. The stop control of the fuel cell system 100 is executed after the stop request to the fuel cell system 100 (stop request by the key-off operation, etc., of the operator).

In Step S31, the fuel pump 3 and the cathode compressor 10 are sopped, and the valve 111A is closed. By so doing, supplies of the anode gas and the cathode gas to the fuel cell stack 1 are stopped. Thereafter, the fuel cell stack 1 generates a power only by the anode gas remained in the fuel supply system and the cathode gas remained in the air supply system.

In Step S32, judgement is made whether or not the temperature T1 of the fuel cell stack 1 obtained by the temperature sensor T1 is equal to or higher than the stop temperature Tc1. When the temperature T1 of the fuel cell stack 1 is equal to or higher than the stop temperature Tc1 (S32: Yes), it is judged that control of the oxygen partial pressure Pa_O2 of the anode electrode is necessary; and thus, the process is advanced to Step S33. On the other hand, when the temperature T1 of the fuel cell stack 1 is lower than the stop temperature Tc1 (S32: No), it is judged that the fuel cell stack 1 is sufficiently cooled down so that control of the oxygen partial pressure Pa_O2 of the anode electrode is not necessary; and thus, the process is advanced to Step S37.

In Step S33, judgement is made whether or not the temperature T2 of the exhaust gas burner 12 obtained by the temperature sensor T2 is equal to or higher than the catalyst action temperature Tc2 of the exhaust gas burner 12. In the exhaust gas burner 12, if the temperature thereof is equal to or lower than a predetermined temperature (catalyst action temperature Tc2), the catalytic oxidation reaction becomes difficult. Therefore, when the temperature T2 is equal to or higher than the catalyst action temperature Tc2 (S33: Yes), it is judged that heating of the exhaust gas burner 12 is unnecessary, so that the process is advanced to Step S34. On the other hand, when the temperature T2 is lower than the predetermined temperature Tc2 (S33: No), it is judged that heating of the exhaust gas burner 12 is necessary, so that the process is advanced to Step S36.

In Step S34, the fuel gas pump 8 is started. By starting the fuel gas pump 8, the fuel gas collected by the canister 7 becomes the state that it is ready to be supplied to the exhaust gas burner 12.

In Step S35, after the process of Step S34, the valve 108A is controlled with responding to the temperature T1 of the fuel cell stack 1 such that the fuel cell stack 1 may keep the non-oxidizing region shown in FIG. 2. Specifically, because the fuel gas collected by the canister 7 is supplied to the exhaust gas burner 12, the fuel gas is catalytically burnt with oxygen included in the cathode off-gas that is remained in the path 122, etc. Therefore, because oxygen is consumed in the exhaust gas burner 12, oxygen diffusing to or reversely flowing to the anode electrode of the fuel cell stack 1 via the exhaust gas burner 12 is reduced, so that the oxygen partial pressure Pa_O2 of the anode electrode can be decreased. Meanwhile, details of the action in S35 will be explained by using FIG. 4.

In Step 36, the exhaust gas burner 12 is warmed up such that the temperature of the exhaust gas burner 12 may become equal to or higher than the catalyst action temperature Tc2. For example, warming is executed by a heater (not shown in the figure) that is arranged in the exhaust gas burner 12.

In Step S37, because the temperature T1 of the fuel cell stack 1 is lower than the stop temperature Tc1, it is judged that the anode electrode is satisfactorily cooled down so that there is no possibility of being oxidized; and thus, the fuel gas pump 8 is stopped.

Figure 4:
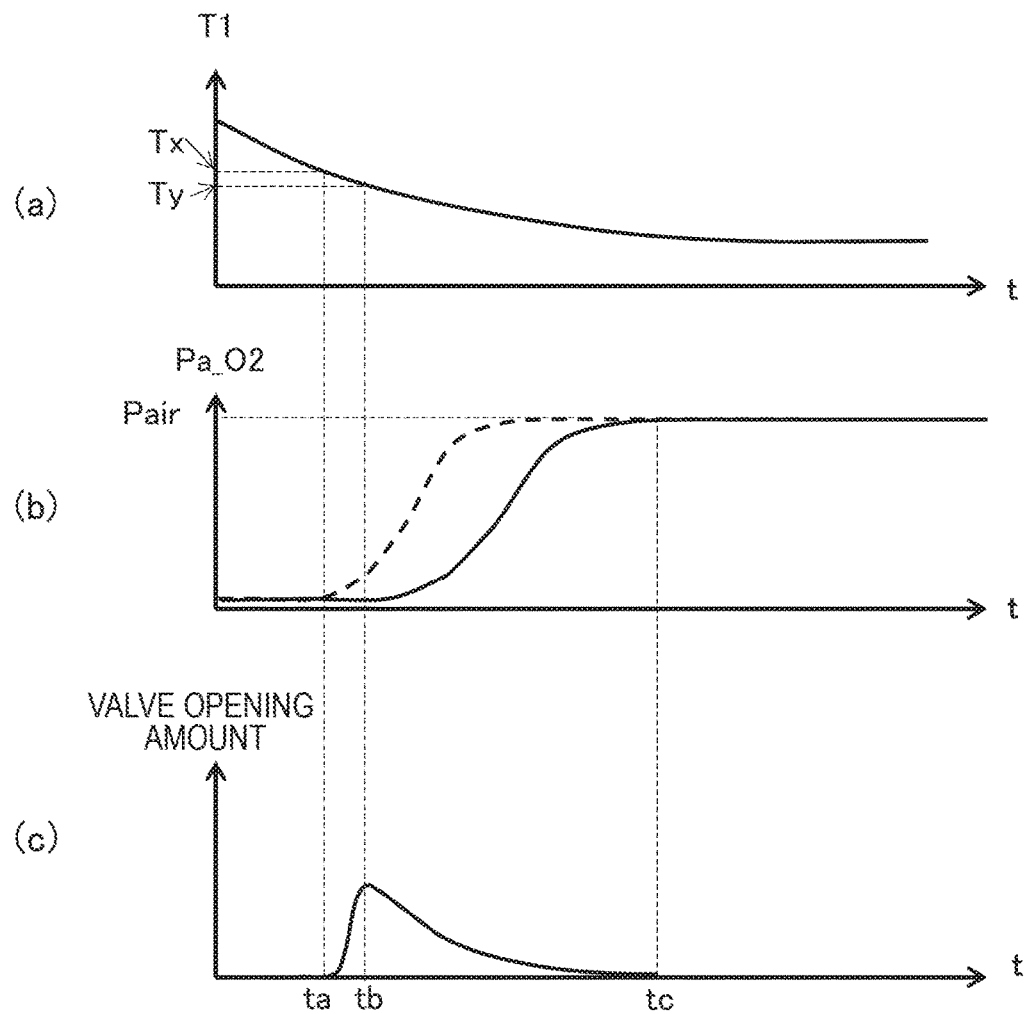
FIG. 4 shows the change of the state of the fuel cell system during the stop control process.

FIG. 4 is one example of the explanation figure of the state of the fuel cell stack 1 when control of the valve 108A (S35) is executed in the stop control process shown in FIG. 3. In all of FIG. 4(a) to FIG. 4(c), time t is shown in the horizontal axis, so that change of the state of the fuel cell stack 1 with time is shown. FIG. 4(a) is the figure showing the temperature T1 of the fuel cell stack 1 obtained by the temperature sensor T1. FIG. 4(b) is the figure showing the oxygen partial pressure Pa_O2 of the anode electrode. The dotted line shows the case that the valve 108A is in the state of being closed so that the fuel gas collected by the canister 7 is not supplied to the exhaust gas burner 12. On the other hand, the solid line shows the case that the control of S35 is executed, so that by controlling the opening amount of the valve 108A the fuel gas collected by the canister 7 is supplied to the exhaust gas burner 12. FIG. 4(c) shows the opening amount of the valve 108A controlled in S35.

Here, reference is made to FIG. 4(a); after the stop control process of the fuel cell system 100, the temperature T1 of the fuel cell stack 1 is gradually dropped with natural cooling.

Reference is made to FIG. 4(b); in the case that the valve 108A is in the state of being closed, the atmospheric air which flows reversely or diffuses reversely from the path 125 into the fuel cell system 100 reaches the anode electrode of the fuel cell stack 1 via the exhaust gas burner 12, so that the oxygen partial pressure Pa_O2 starts to increase at the time ta, as shown by the dotted line. Meanwhile, the states of the reverse flow and reverse diffusion change with the temperature inside the fuel cell system 100.

The temperature inside the fuel cell system 100 can be regarded as the temperature of the fuel cell stack 1. Therefore, in this embodiment, when the temperature T1 of the fuel cell stack 1 reaches the temperature Tx, the temperature corresponding to the time ta shown in FIG. 4(a), the valve 108A is opened as shown in FIG. 4(c). By so doing, the fuel gas collected by the canister 7 is supplied to the exhaust gas burner 12 so that the catalytic oxidation reaction of the fuel gas with oxygen progresses in the exhaust gas burner 12; and thus, oxygen in the exhaust system is consumed. Therefore, in the case that the valve 108A is controlled as shown by the solid line in FIG. 4(*b*), increase of the oxygen partial pressure Pa_O2 is suppressed more as compared with the case that the valve 108A is not controlled as shown in the dotted line.

After the time ta, when the time reaches tb, the reversed flow and reversed diffusion of the atmospheric air into the fuel cell system 100 from the path 125 become sluggish. Then, when the temperature T1 of the fuel cell stack 1 reaches the temperature Ty, the temperature corresponding to the time tb shown in FIG. 4(*a*), the opening amount of the valve 108A is gradually decreased as the temperature T1 of the fuel cell stack 1 drops, as shown in FIG. 4(*c*).

Then, at the time tc, the oxygen partial pressure Pa_O2 of the anode electrode becomes equal to the atmospheric oxygen partial pressure Pair; and thus, the natural cooling of the fuel cell system 100 is over, as shown in FIG. 4(*b*). In the way as mentioned above, the increase rate of the oxygen partial pressure Pa_O2 relative to the dropping rate of the temperature T1 is properly controlled as shown in FIG. 2, the fuel cell stack 1 can be cooled down without passing through the oxidizing region. Therefore, the fuel cell system 100 can be stopped with suppressing the deterioration of the anode electrode of the fuel cell stack 1.

According to the fuel cell system 100 of the first embodiment, following advantageous effects can be obtained.

The anode electrode of the fuel cell stack 1 is prone to be readily oxidized when it is contacted to an atmospheric air in the state thereof being at high temperature. Therefore, the anode electrode is prone to be readily oxidized immediately after the start of the stop control process of the fuel cell system 100, because the fuel cell stack 1 is in the state of being at high temperature. Under the state like this, if the air reached the exhaust gas burner 12 via the paths 125, 124, and 123 reaches the anode electrode of the fuel cell stack 1 via the path 121, the anode electrode is deteriorated by oxidation. Therefore, the oxygen partial pressure of the anode electrode needs to be decreased.

According to the fuel cell system 100 of the first embodiment, the anode gas is supplied to the fuel cell stack 1 via the paths 101, 102, 103, 104, and 105 (anode supply route), and in addition, the fuel gas stored in the fuel tank 2 and collected by the canister 7 is supplied to the exhaust gas burner 12 via the paths 107 and 108 (fuel supply route). By so doing, oxygen is consumed by the catalytic combustion reaction in the exhaust gas burner 12, so that the amount of oxygen reaching the anode electrode of the fuel cell stack 1 can be reduced. Accordingly, because the increase of the oxygen partial pressure Pa_O2 of the anode electrode can be suppressed, the anode electrode can be prevented from being oxidized.

Also, according to the fuel cell system 100 of the first embodiment, the fuel gas collected by the canister 7 is supplied to the exhaust gas burner 12 by the fuel gas pump 8. By so doing, the fuel gas can be readily supplied to the exhaust gas burner 12, so that increase of the oxygen partial pressure Pa_O2 of the anode electrode can be suppressed; and thus, the anode electrode can be prevented from being oxidized.

Also, according to the fuel cell system 100 of the first embodiment, open and close of the valve 108A (fuel gas supply valve) is controlled in accordance with the temperature of the fuel cell stack 1. The control unit 13 remembers the valve opening amount corresponding to the temperature T1 of the fuel cell stack 1 as shown in FIG. 4. Therefore, the opening amount of the valve 108A is increased when the temperature T1 reaches the reaching temperature Tx. Then, after the temperature T1 reaches Ty, the opening amount of the valve 108A is gradually decreased. By so doing, the fuel gas collected by the canister 7 can be supplied properly to the exhaust gas burner 12. Accordingly, the oxygen partial pressure of the anode electrode can be decreased without unnecessarily supplying the fuel gas, so that the anode electrode of the fuel cell stack 1 can be prevented from being oxidized.

Second Embodiment

In the first embodiment, the fuel gas pump 8, the valve 108A, etc., are controlled in accordance with the temperature T1 of the fuel cell stack 1, but the control is not limited to them. In the second embodiment, an example in which the control is further made in accordance with the pressure P1 in the fuel cell stack 1 will be explained.

Figure 5:
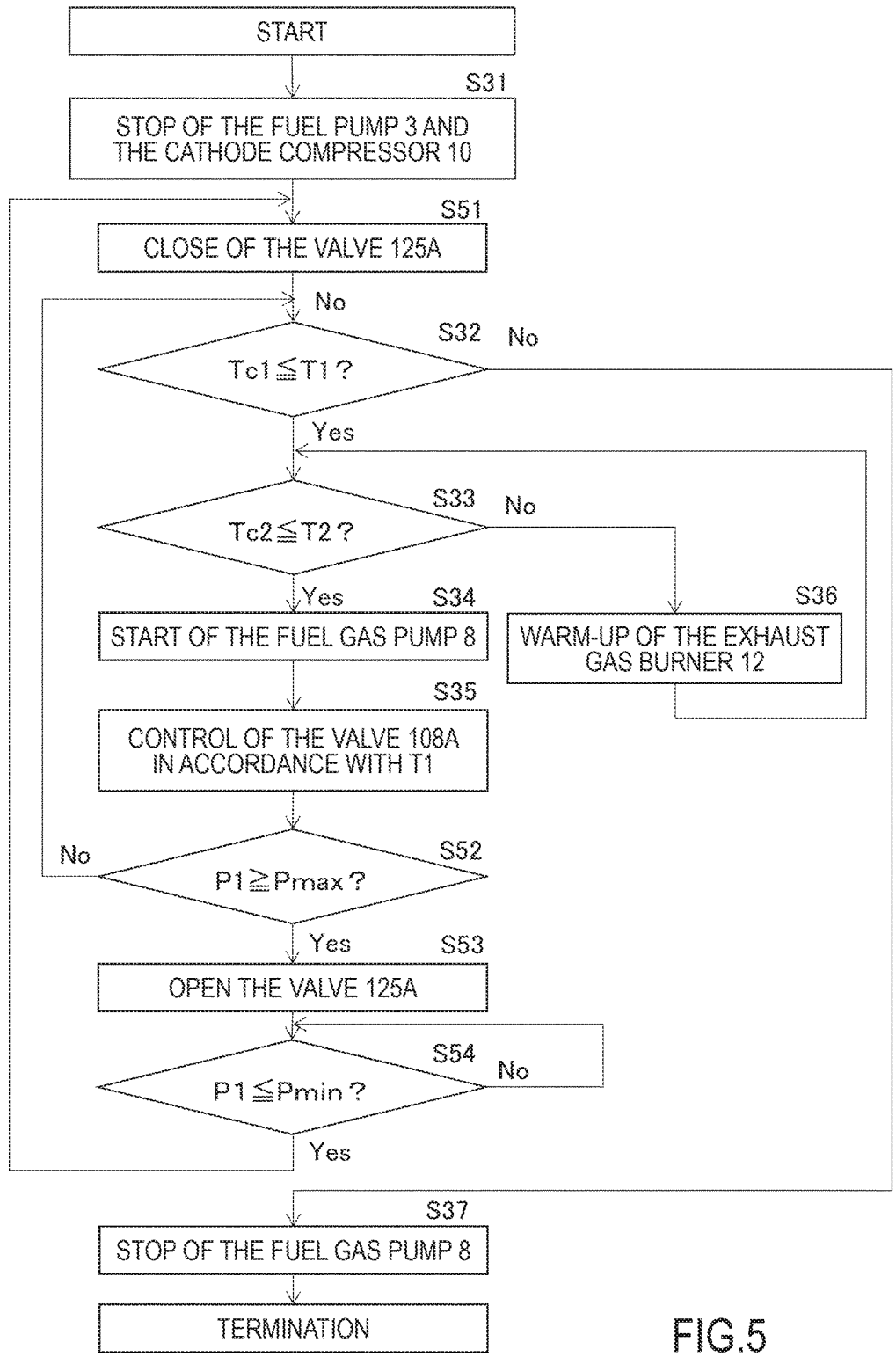
FIG. 5 is a flow chart showing the stop control process according to the second embodiment.

FIG. 5 is the flow chart showing the control of the fuel cell system 100 of the second embodiment. The flow chart shown in this figure is different from the flow chart in the first embodiment shown in FIG. 3 in that the process of Step S51 is added between the process of Step S31 and the process of Step S32, and that processes of Steps S52 to S54 are added after the process of Step S35.

First, when the stop control process is started, the valve 125A is closed in Step S51. By so doing, the reversed flow of the atmospheric air via the path 125 can be suppressed, so that increase of the oxygen partial pressure Pa_O2 of the anode electrode can be suppressed.

Here, under the state that the valve 125A is being closed, the pressure P1 of the fuel cell stack 1 decreases as the temperature of the fuel cell system 100 drops. On the other hand, when the fuel gas collected by the canister 7 is supplied to the exhaust gas burner 12, the fuel gas and air are caused to react to generate the exhaust gas as the catalytic combustion reaction takes place, thereby resulting in increase of the pressure P1 of the fuel cell stack 1.

Meanwhile, depending on the pressure P1 in the fuel cell stack 1, there is a possibility that the fuel cell stack 1 is physically deteriorated. Therefore, in Steps S52 to S54, the valve 125A is controlled in accordance with the pressure P1. Hereunder, the processes of S52 to S54 use the pressure range in which the pressure P1 at which the possibility to cause physical deterioration of the fuel cell stack 1 is high is taken as an upper limit and the pressure P1 at which it can be judged that there is no possibility of physical deterioration of the fuel cell stack 1 is taken as a lower limit.

In Step S52, the judgement is made whether or not the pressure P1 in the fuel cell stack 1 is equal to or higher than the upper limit pressure Pmax of the proper range. If the pressure P1 is equal to or higher than the upper limit pressure Pmax (S52: Yes), it is judged that there is a possibility that the fuel cell stack 1 is physically deteriorated so that the pressure P1 needs to be decreased; and thus, the process is advanced to Step S53. On the other hand, if the pressure P1 is lower than the upper limit pressure Pmax (S52: No), it is judged that decrease of the pressure P1 is not necessary; and thus, the process is returned to Step S32.

In Step S53, the valve 125A is opened. By so doing, the pressure P1 in the fuel cell stack 1 is decreased, so that the pressure P1 becomes equal to or lower than the upper limit pressure Pmax.

In Step S54, the judgment is made whether or not the pressure P1 in the fuel cell stack 1 is equal to or lower than the lower limit pressure Pmin. When the pressure P1 is equal to or lower than the lower limit pressure Pmin (S54: Yes), it is judged that the possibility to cause the physical deterioration of the fuel cell stack 1 is decreased; and thus, the process is advanced to Step S51. On the other hand, when the pressure P1 is higher than the lower limit pressure Pmin (S54: No), it is judged that decrease of the pressure P1 needs to be continued; and thus, the judgement of Step S54 is continued.

According to the fuel cell system 100 of the second embodiment, following advantageous effects can be obtained.

According to the fuel cell system 100 of the second embodiment, the valve 125A (exhaust valve) is operated in accordance with the pressure applied to the fuel cell stack 1. During the valve 125A is closed, flow of the atmospheric air from outside the fuel cell system 100 is suppressed. Therefore, not only oxygen is consumed by supply of the fuel gas from the canister 7 to the exhaust gas burner 12, but also the flow of the atmospheric air into the fuel cell system 100 is suppressed. Therefore, increase of the oxygen partial pressure of the anode electrode of the fuel cell stack 1 can be suppressed further, so that deterioration of the anode electrode by oxidation can be suppressed.

Also, if the pressure applied to the fuel cell stack 1 is too high, there is a possibility that the fuel cell stack 1 is physically deteriorated. Therefore, when the pressure P1 in the fuel stack 1 becomes higher than the upper limit pressure Pmax (S52: No), the valve 125A is opened (S53). Thereafter, when the pressure P1 in the fuel cell stack 1 becomes lower than the lower limit pressure Pmin (S54: Yes), the valve 125A is closed (S51). By so doing, the flow of the atmospheric air from outside the fuel cell stack 1 is suppressed with suppressing the physical deterioration of the fuel cell stack 1; and thus, the anode electrode can be prevented from deterioration by oxidation.

Third Embodiment

In the first embodiment, the example in which the fuel gas pump 8 is arranged was explained; but the embodiment is not limited to this. In the third embodiment, an example in which the fuel gas pump 8 is not arranged will be explained.

Figure 6:
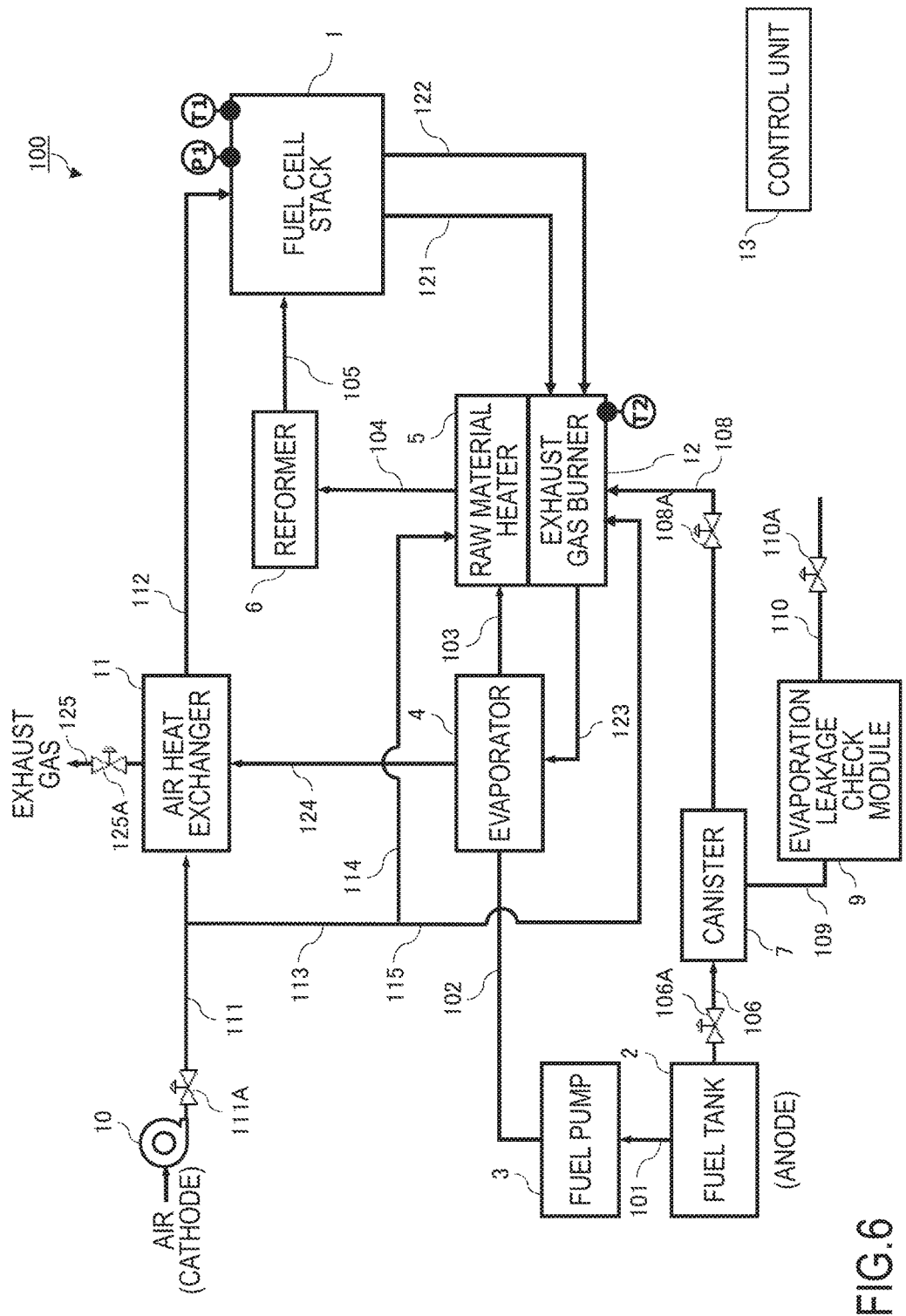
FIG. 6 is a block diagram of the fuel cell system according to the third embodiment.

FIG. 6 is the block diagram of the fuel cell system 100 of the third embodiment. The rough configuration figure shown in this figure is different from the block diagram of the first embodiment shown in FIG. 1 in that the fuel gas pump 8 is deleted.

Figure 7:
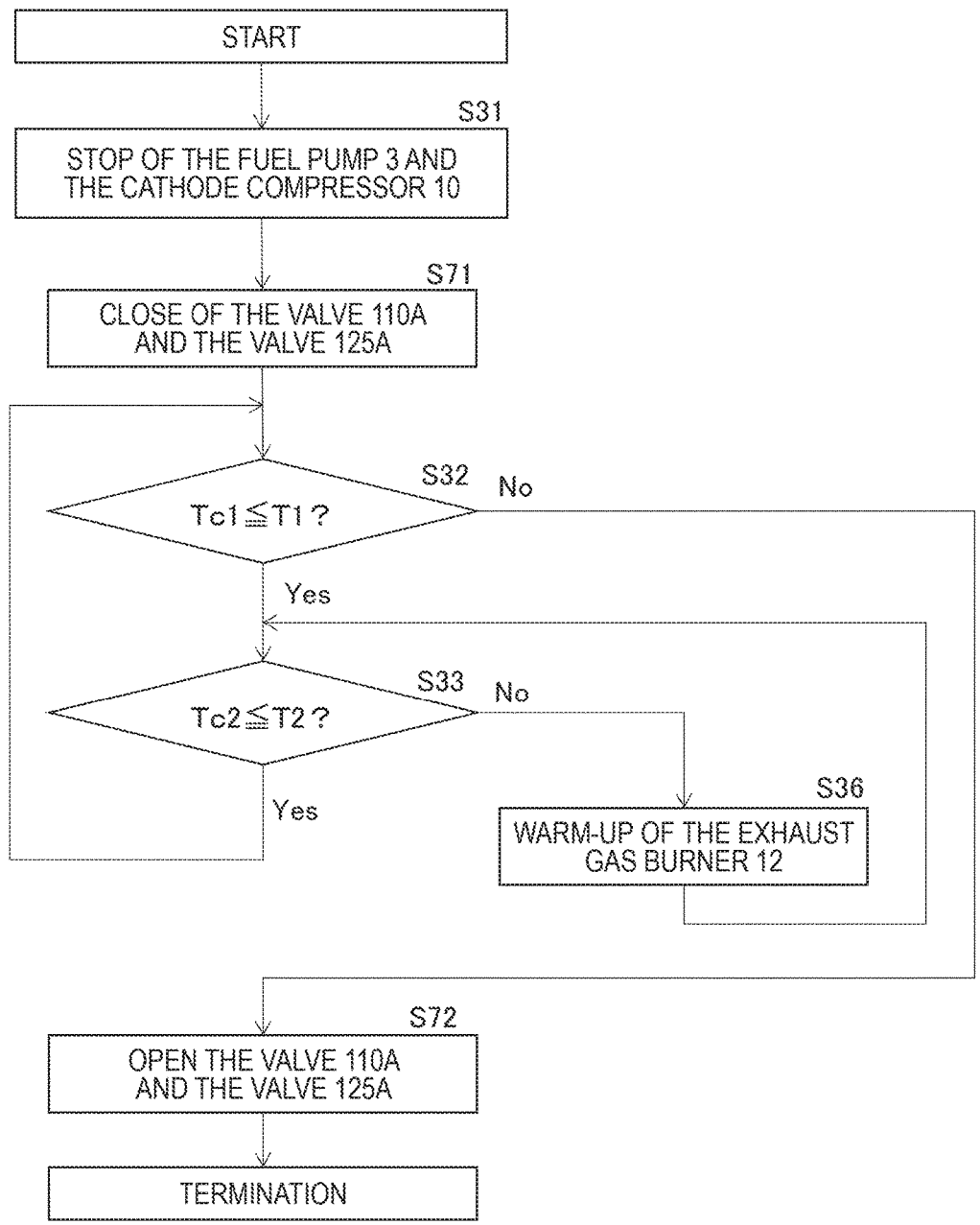
FIG. 7 is a flow chart showing the stop control process.

FIG. 7 is the flow chart showing the control of the fuel cell system 100 of the third embodiment. The flow chart shown in this figure is different from the flow chart in the first embodiment shown in FIG. 3 in that Step S71 is added before Step S31, and that Steps S34, S35, and S37 are deleted, and that Step S72 is added before the termination process.

In Step S71, the valves 110A and 125A are closed so that the flow of the outside air into the fuel cell system 100 is suppressed. If the fuel cell system 100 is cooled down under this state, the pressure inside the fuel cell system 100 is decreased thereby generating a negative pressure. Because of this, the fuel gas collected by the canister 7 is spontaneously supplied to the exhaust gas burner 12 via the path 108.

And, when the temperature T1 of the fuel cell stack 1 becomes lower than the stop temperature Tc1 (S32: No), the process of Step S72 is executed. In Step S72, the valves 110A and 125A are opened. Under this state, the fuel cell stack 1 is sufficiently cooled down, so that there is no possibility that the anode electrode is deteriorated by oxidation even if it is contacted with an atmospheric air. Accordingly, the fuel cell system 100 can be sopped by opening the valves.

According to the fuel cell system 100 of the third embodiment, following advantageous effects can be obtained.

According to the third embodiment, when the fuel cell system 100 is stopped, the valve 125A (exhaust valve) and the valve 110A (outside air valve) are closed. By so doing, the fuel cell system 100 is sealed. Here, after the fuel cell system 100 is stopped, power generation in the fuel cell stack 1 is stopped, so that drop of the temperature of the fuel cell system 100 starts. When the temperature is dropped under the sealed state, the pressure is decreased thereby generating a negative pressure. Under the state like this, the fuel gas collected by the canister 7 is spontaneously supplied to outside the canister 7, so that it is supplied to the exhaust gas burner 12 via the path 108. In this way, the fuel gas can be supplied to the exhaust gas burner 12 without arranging the fuel gas pump 8, so that configuration of the fuel cell system 100 can be simplified.

Also, according to the third embodiment, when the fuel cell stack 1 is sufficiently cooled down (S32: No), the valve 125A and the valve 110A are opened. As shown in FIG. 2, when the temperature T1 of the fuel cell stack is lower than the stop temperature Tc1, even if the oxygen partial pressure Pa_O2 of the anode electrode becomes the atmospheric oxygen partial pressure Pair, there is no possibility of deterioration of the anode electrode. Therefore, when the valves 110A and 125A are opened so as to make the fuel cell system 100 a steady state, a negative pressure is not aggressively applied to the fuel cell stack 1; and thus, physical deterioration of the fuel cell stack 1 can be suppressed.

In the above description, embodiments of the present invention have been explained. However, the embodiments described above are mere partial examples of the application of the present invention; and thus, the description does not intend to limit the claims of the present invention within the specific composition of these embodiments. Furthermore, the embodiments described above can be arbitrarily combined.

The present application claims a priority of Japanese Patent Application No. 2015-244172 filed with the Japan Patent Office on Dec. 15, 2015, and all the contents of which are hereby incorporated by reference.

The invention claimed is:

1. A fuel cell system, wherein the fuel cell system comprises a solid oxide fuel cell which generates a power by receiving a supply of an anode gas and a cathode gas, the system further comprising:
  a fuel tank to store a liquid fuel which is to become the anode gas,
  an anode supply path connecting the fuel tank and an anode electrode of the fuel cell,
  an exhaust gas burner to burn an anode off-gas and a cathode off-gas, both gases having been discharged from the fuel cell,
  a collector which is communicated to the fuel tank and collects the fuel which is vaporized in the fuel tank,
  a fuel supply path which connects the collector with the exhaust gas burner,
  a fuel gas supply valve arranged in the fuel supply path,
  a control unit programmed to control the fuel gas supply valve and execute a stop control of the fuel cell system, and wherein when the control unit executes the stop control of the fuel cell system, the fuel collected by the collector is supplied to the exhaust gas burner via the fuel supply path.

2. The fuel cell system according to claim 1, wherein the system further comprises:
   a pump which is arranged in the fuel supply path and supplies the fuel that is collected by the collector to the exhaust gas burner.

3. The fuel cell system according to claim 1,
   wherein when the fuel cell system is stopped, the fuel gas supply valve is controlled in accordance with a temperature of the fuel cell by the control unit.

4. The fuel cell system according to claim 3, wherein
   when the fuel cell system is stopped, the fuel gas supply valve is opened if a temperature of the fuel cell is lower than a predetermined temperature.

5. The fuel cell system according to claim 4, wherein
   when the fuel cell system is stopped, the fuel gas supply valve is controlled such that valve opening amount thereof decreases as the temperature of the fuel cell drops.

6. The fuel cell system according to claim 1, wherein the system further comprises:
   an exhausting path to discharge an exhaust gas from the exhaust gas burner to outside the fuel cell system,
   an exhaust valve arranged in the exhausting path,
   the control unit programmed to control the exhaust valve; and
   a pressure sensor provided in the fuel cell, wherein
   when the fuel cell system is stopped, the exhaust valve is controlled by the control unit in accordance with a pressure inside the fuel cell system obtained by the pressure sensor.

7. The fuel cell system according to claim 6, wherein
   when the fuel cell system is stopped, the exhaust valve is opened if the pressure inside the fuel cell system is higher than an upper limit pressure and is closed if the pressure inside the fuel cell system is lower than a lower limit pressure.

8. The fuel cell system according to claim 1, wherein the system further comprises:
   an exhausting path to discharge an exhaust gas from the exhaust gas burner to outside the fuel cell system,
   an exhaust valve arranged in the exhausting path,
   a pipe which is communicated from the collector to outside the fuel cell system, and
   an outside air valve arranged in the pipe; and
   the exhaust valve and the outside air valve are closed when the fuel cell system is stopped.

9. The fuel cell system according to claim 8, further comprising
   a temperature sensor provided in the fuel cell; and
   the control unit programmed to control the exhaust valve, wherein
   the exhaust valve and the outside air valve are opened by the control unit if a temperature of the fuel cell obtained by the temperature sensor is lower than a stop temperature.

* * * * *